(12) United States Patent
Shinoda et al.

(10) Patent No.: US 8,134,908 B2
(45) Date of Patent: Mar. 13, 2012

(54) DIFFRACTIVE OPTICAL ELEMENT AND OPTICAL PICKUP

(75) Inventors: Masahisa Shinoda, Tokyo (JP); Daisuke Matsubara, Tokyo (JP); Kenya Nakai, Tokyo (JP); Hironori Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 12/513,616

(22) PCT Filed: Feb. 19, 2008

(86) PCT No.: PCT/JP2008/052734
§ 371 (c)(1),
(2), (4) Date: May 5, 2009

(87) PCT Pub. No.: WO2008/105265
PCT Pub. Date: Sep. 4, 2008

(65) Prior Publication Data
US 2010/0097917 A1   Apr. 22, 2010

(30) Foreign Application Priority Data
Feb. 26, 2007   (JP) .................................. 2007-044942

(51) Int. Cl.
*G11B 7/00*   (2006.01)
(52) U.S. Cl. ......... 369/112.12; 369/112.11; 369/112.03; 369/109.01
(58) Field of Classification Search ............. 369/109.01, 369/112.01, 112.03, 112.11, 112.12, 112.06, 369/112.07
See application file for complete search history.

(56) References Cited

U.S. PATENT DOCUMENTS

| | | | |
|---|---|---|---|
| 7,184,387 B2* | 2/2007 | Hendriks et al. | 369/112.19 |
| 2004/0125737 A1* | 7/2004 | Iwata et al. | 369/121 |
| 2005/0226124 A1* | 10/2005 | Kimura et al. | 369/112.08 |
| 2005/0270912 A1* | 12/2005 | Sato et al. | 369/44.11 |
| 2006/0077792 A1 | 4/2006 | Kimura et al. | |
| 2006/0098287 A1 | 5/2006 | Ariyoshi et al. | |
| 2006/0140078 A1* | 6/2006 | Nagatomi et al. | 369/44.37 |
| 2006/0227838 A1 | 10/2006 | Hata et al. | |

FOREIGN PATENT DOCUMENTS

| | | |
|---|---|---|
| JP | 2002-311219 A | 10/2002 |
| JP | 2005-327403 A | 11/2005 |
| JP | 2005-339771 A | 12/2005 |
| JP | 2006-134366 A | 5/2006 |
| JP | 2006-134551 A | 5/2006 |
| JP | 2006-244606 A | 9/2006 |
| JP | 2006-278576 A | 10/2006 |

* cited by examiner

*Primary Examiner* — Adam R Giesy
(74) *Attorney, Agent, or Firm* — Birch, Stewart, Kolasch & Birch, LLP

(57) ABSTRACT

An optical pickup with a simplified structure in which, according to the type of optical disc, diffracted light from three types of laser light can be directed efficiently onto a photodetector and appropriate focus control can be performed based on the signals detected by the photodetector, and a diffractive optical element that can be used in the optical pickup, which has a semiconductor laser 10 that can emit three types of laser light, a diffractive optical element 42 that diffracts the laser light reflected from the optical disc 31, and a single photodetector 43 that detects the diffracted light exiting the diffractive optical element 42. The diffractive optical element 42 is structured so that 0-order light is the maximal component of the diffracted light generated from each of two of three types of laser light, the two having close wavelengths (with a small wavelength difference), and +1-order light or −1-order light is the maximal component of the diffracted light generated from the remaining one type of laser light.

11 Claims, 11 Drawing Sheets

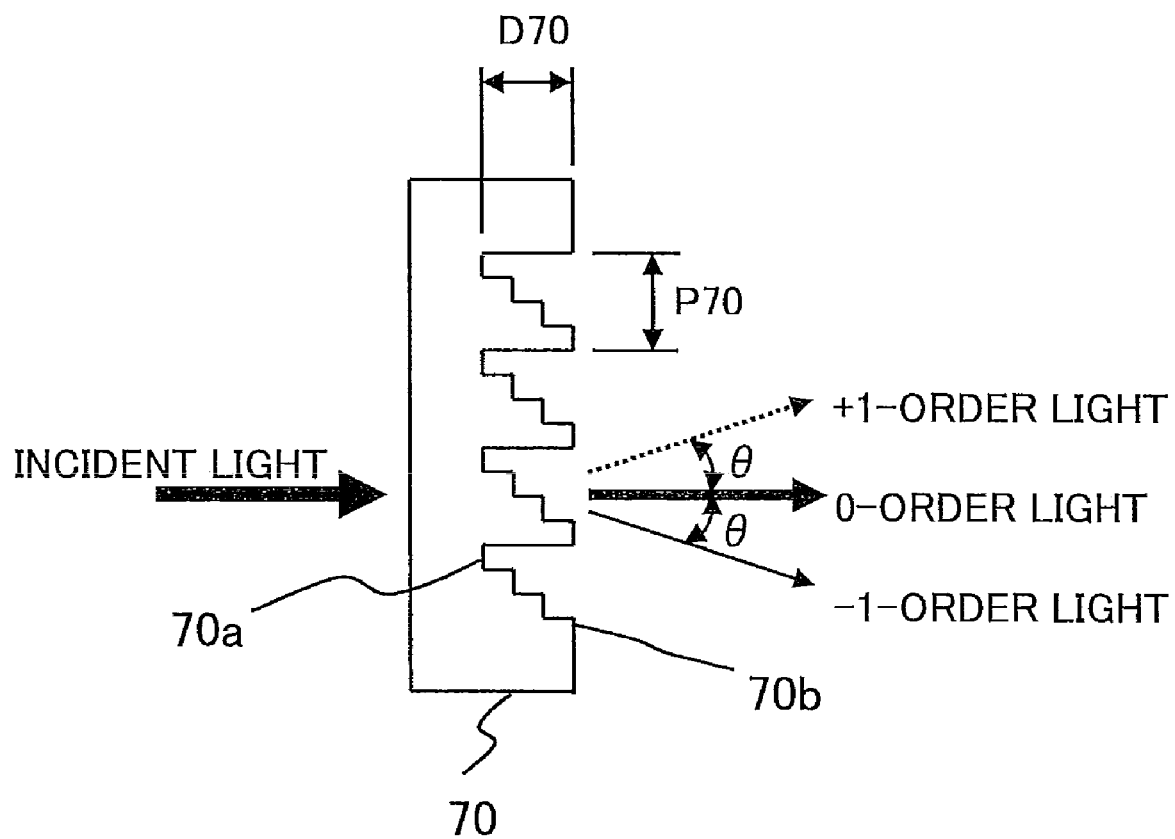

FIG. 9

| STANDARD | | | CD | RED DVD | BLUE LASER OPTICAL DISC | |
|---|---|---|---|---|---|---|
| SPECIFICATION ITEM | SYMBOL | UNIT | | | HD-DVD | Blu-ray |
| WAVELENGTH | $\lambda$ | $\mu m$ | 0.78 | 0.65 | 0.405 | 0.405 |
| NUMERICAL APERTURE OF OBJECTIVE LENS | NA | | 0.45 | 0.60 | 0.65 | 0.85 |
| DEPTH OF FOCUS | $\lambda/(NA)^2$ | $\mu m$ | 3.85 | 1.81 | 0.96 | 0.56 |
| DEPTH OF FOCUS RATIO (REFERENCED TO CD) | | | 1 | 0.47 | 0.25 | 0.15 |

FIG. 10

| STANDARD | | CD | RED DVD | BLUE LASER OPTICAL DISC | |
|---|---|---|---|---|---|
| ITEM FOR FOCUS ERROR SIGNAL | | | | HD-DVD | Blu-ray |
| DEPTH OF FOCUS | (REFERENCED TO CD) | 1 | 0.47 | 0.25 | 0.15 |
| LINEAR RANGE DESIGN STRATEGY FOR FOCUS ERROR SIGNAL | DESIGN STRATEGY 1 | SHARED LINEAR RANGE | | INDEPENDENT LINEAR RANGE | |
| | DESIGN STRATEGY 2 | INDEPENDENT LINEAR RANGE | SHARED LINEAR RANGE | | |

WAVELENGTH: 0.65 μm OR 0.78 μm

WAVELENGTH: 0.405 μm

WAVELENGTH: 0.405 μm OR 0.65 μm

WAVELENGTH: 0.78 μm

DIFFRACTIVE OPTICAL ELEMENT AND OPTICAL PICKUP

TECHNICAL FIELD

The present invention relates to an optical pickup supporting three optical disc standards, and a diffractive optical element mountable in the optical pickup.

BACKGROUND ART

As commercially available optical discs, there are CDs (compact discs), on which the recording and reproducing of information is carried out by use of an infrared laser beam with a center wavelength of 0.78 μm, and DVDs (digital versatile discs), on which the recording and reproducing of information is carried out by use of a red laser beam with a center wavelength of 0.65 μm. HD-DVDs and Blu-ray discs, on which the recording and reproducing of information is carried out by use of a blue laser beam with a center wavelength of 0.405 μm, are also starting to become commercially available (HD-DVDs and Blu-ray discs will both be referred to below as 'blue laser optical discs' or 'blue optical discs').

Recording and reproducing devices for blue laser optical discs are generally structured so that they can also record and reproduce information on conventional DVDs and CDs. As optical pickups suitable for recording and reproducing devices that can record and reproduce information on a plurality of types of optical discs, pickups that can selectively emit laser beams with a plurality of wavelengths have been proposed (see, for example, Patent Documents 1 and 2).

Patent Document 1: Japanese Patent Application Publication No. 2005-339771 (paragraphs 0057-0058, FIG. 3)

Patent Document 2: Japanese Patent Application Publication No. 2002-311219 (paragraphs 0024-0031, FIGS. 1 and 2)

DISCLOSURE OF THE INVENTION

Problems to be Solved by the Invention

In an optical pickup that can emit laser beams with a plurality of wavelengths, however, it is extremely difficult to detect the light reflected from a Blu-ray disc, the light reflected from a DVD, and the light reflected from a CD with a single optical detection system and generate the focus error signal needed for focus control (focus servo) on the basis of the detected signal. The reason is that when the reflected laser light is detected by a single optical detection system, the linear range of the focus error signal (the range over which the relation between the focus error and the amplitude of the focus error signal can be regarded as a first-degree function: for example, the range LZ1 in FIG. 11(A), discussed later) has the same length for each optical disc, even though the focus error tolerance differs depending on the type of optical disc; the linear range of the focus error signal does not assume a length suitable for each type of optical disc. To provide a conventional optical pickup with functions for detecting laser light reflected from a Blu-ray disc, laser light reflected from a DVD, and laser light reflected from a CD, it has therefore been necessary to provide a plurality of optical detection systems, a factor that prevents the optical pickup from being simplified and miniaturized, and forces up the cost of the optical pickup.

The reason why the focus error signals needed for focus control have been generated on the basis of signals detected by a plurality of optical detection systems will now be explained in detail.

The depth of focus calculated from the wavelength of the light source and the numerical aperture of the objective lens is used as an estimate of the focusing tolerance in focus control in an optical pickup. The depth of focus in the Blu-ray standard is small: approximately ⅐ of the depth in the CD standard. The Blu-ray standard and DVD standard also include specifications for dual-layer discs with signal surfaces one above the other, and to perform focus control with a distinction between the two signal surfaces, the linear range of the focus error signal must be sufficiently less than the spacing between the two signal surfaces.

If the linear range of the focus error signal is made small, however, focus control becomes difficult for CDs, which have a large allowable wobble of the optical disc surface in the focusing direction (and thus have a large focus error tolerance).

Conversely, if the linear range of the focus error signal is made large, although focus control of CDs becomes easier, the accuracy of focus control for Blu-ray discs and DVDs is reduced, and it becomes impossible to distinguish the individual layers of a dual-layer disc.

The approximately factor-of-seven difference between the depths of focus in the CD standard and the Blu-ray standard made it extremely difficult to set a linear range of the focus error signal that could simultaneously satisfy both standards. That is why the focus error signals needed for focus control were generated on the basis of signals detected by a plurality of optical detection systems.

An object of the present invention is therefore to provide a diffractive optical element in which 0-order light is the maximal component of diffracted light generated from each of two of three types of laser light, the two having close wavelengths (with a small wavelength difference), and +1-order light or −1-order light is the maximal component of diffracted light generated from the remaining one type of laser light.

Another object of the present invention is, by using the above diffractive optical element, to provide an optical pickup with a simplified structure in which, according to the type of optical disc, diffracted light from three types of laser light can be directed efficiently onto a photodetector and appropriate focus control can be performed based on the signals detected by the photodetector.

Means of Solution of the Problems

The inventive diffractive optical element has an optical means for outputting, when first laser light having a first wavelength as a center wavelength is incident, first diffracted light, which is diffracted light of the first laser light, outputting, when second laser light having a second wavelength as a center wavelength is incident, second diffracted light, which is diffracted light of the second laser light, and outputting, when third laser light having a first wavelength as a center wavelength is incident, third diffracted light, which is diffracted light of the third laser light; the optical means is structured so that 0-order light is a maximal component of each of the first diffracted light and the second diffracted light and +1-order light or −1-order light is a maximal component of the third diffracted light, or so that 0-order light is a maximal component of each of the second diffracted light and the third diffracted light and +1-order light or −1-order light is a maximal component of the first diffracted light.

The inventive optical pickup has: a laser light source for emitting first laser light having a first wavelength as a center wavelength, second laser light having a second wavelength longer than the first wavelength as a center wavelength, and third laser light having a third wavelength longer than the second wavelength as a center wavelength; the above diffractive optical element, disposed on a light path of laser light reflected from an optical disc onto which one of the first laser light, the second laser light, and the third laser light is directed; and a single photodetector for detecting the first diffracted light, the second diffracted light, and the third diffracted light that exit the diffractive optical element.

Effect of the Invention

According to the inventive diffractive optical element, 0-order light can be made the maximal component of the diffracted light generated from each of two of three types of laser light, the two having close wavelengths (with a small wavelength difference), and +1-order light or −1-order light can be made the maximal component of the diffracted light generated from the remaining one type of laser light. By use of the inventive diffractive optical element, it is accordingly possible to use 0-order diffracted light for two of three types of laser light, the two having close wavelengths, and to use +1-order light or −1-order light for the remaining one type of laser light.

According to the inventive optical pickup, by use of the above diffractive optical element, it is possible, according to the type of optical disc, to direct 0-order light onto the photodetector for two of three types of light, the two having close wavelengths, and to direct +1-order light or −1-order light onto the same photodetector for the remaining one type of laser light. Therefore, according to the inventive optical pickup, diffracted light from three types of laser light can be directed efficiently onto a single photodetector according to the type of optical disc, and appropriate focus control can be performed based on the signals detected by the photodetector. Because there is only one photodetector, the structure of the optical pickup can also be simplified and an inexpensive optical pickup can be provided.

BRIEF DESCRIPTION OF THE DRAWINGS

FIG. 6 is a drawing illustrating the function of a diffractive optical element having stepped grooves.

FIG. 9 is a table of optical disc specifications.

FIG. 10 is a table showing the depth of focus ratio in the optical disc specifications and showing design strategies for the linear range of the focus error signal.

EXPLANATION OF REFERENCE CHARACTERS

10 semiconductor laser, 11, 11a first light source, 12, 12a, second light source, 13, 13a third light source, 14, 14a first semiconductor laser element, 15, 15a second semiconductor laser element, 16 heat sink member, 17 package, 21 beam splitter, 22 collimator lens, 23 objective lens, 24 servo mechanism, 31 optical disc, 40 optical detection system, 41 cylindrical lens, 42 diffractive optical element, 43 photodetector, 50 detection circuit, 51, focus error detection circuit, 52 focus servo circuit, 53 tracking error detection circuit, 54 tracking servo circuit, 421, 422, 423, 424 diffraction regions, 421a-421f, 422a-422f, 423a-423f, 424a-424f annular regions, L1 first laser light, L2 second laser light, L3 third laser light, R1 first reflected laser light, R2 second reflected laser light, R3 third reflected laser light.

BEST MODE FOR CARRYING OUT THE INVENTION

First Embodiment

Figure 1:
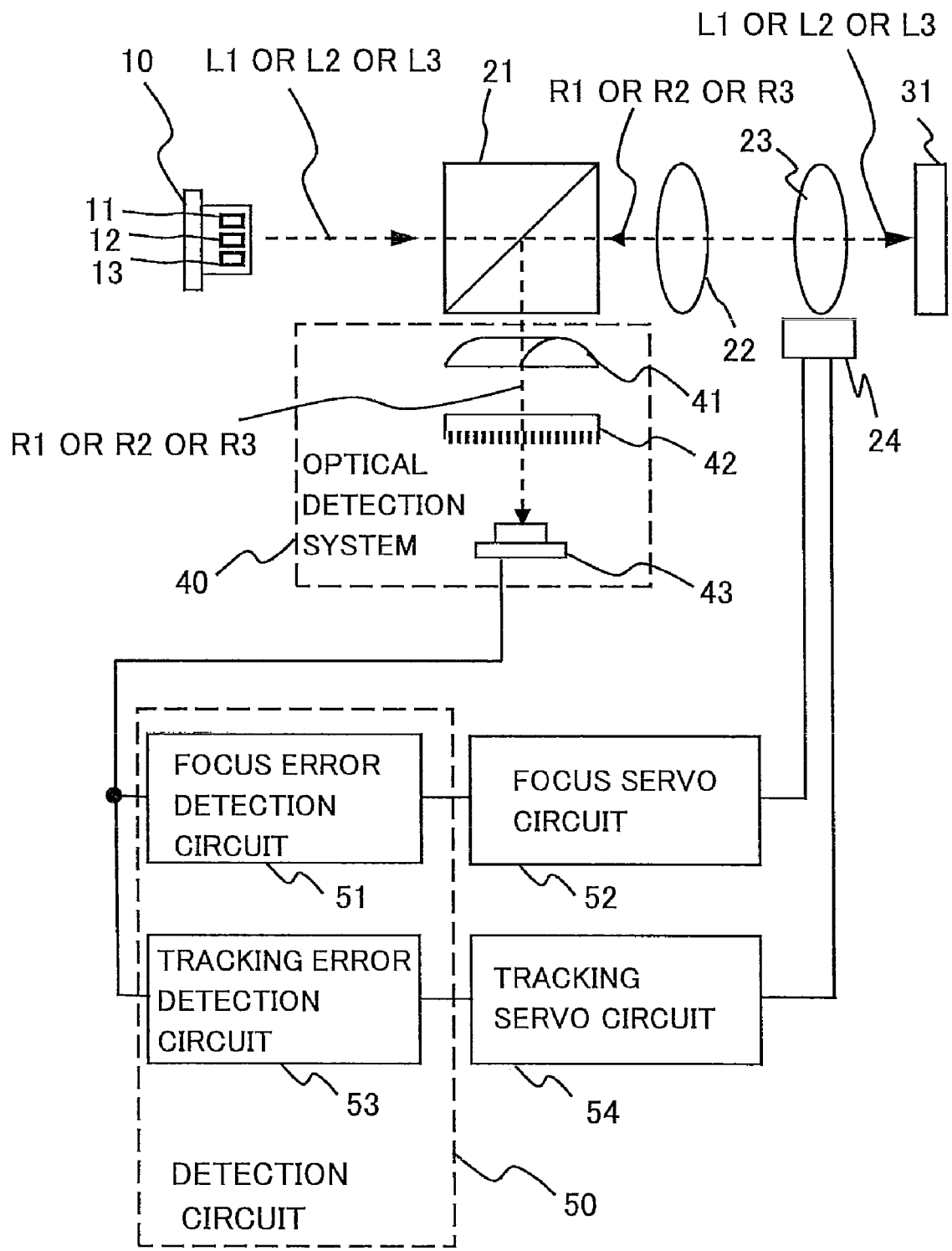
FIG. 1 is a plan view schematically showing the structure of an optical pickup according to a first embodiment of the invention.

FIG. 1 is a plan view schematically showing the structure of an optical pickup according to a first embodiment of the invention. As shown in FIG. 1, the optical pickup in the first embodiment has a semiconductor laser 10, which is a laser light source that emits first laser light L1 having a first wavelength as a center wavelength, second laser light L2 having a second wavelength longer than the first wavelength as a center wavelength, and third laser light L3 having a third wavelength longer than the second wavelength as a center wavelength, a beam splitter 21, a collimator lens 22 for parallelizing the laser light (L1 or L2 or L3) emitted from the semiconductor laser 10, an objective lens 23 that focuses the laser light (L1 or L2 or L3) exiting the collimator lens 22, and a servo mechanism 24 for performing focus control and tracking control of the objective lens 23. The semiconductor laser 10 has a first light source 11 that emits the first laser light L1, a second light source 12 that emits the second laser light L2, and a third light source 13 that emits the third laser light L3. The emitted laser light is selected from among laser light L1, L2, and L3 according to the type of optical disc. The beam splitter 21 passes the laser light (L1 or L2 or L3) emitted from the semiconductor laser 10, and changes the propagation direction of the laser light (R1 or R2 or R3) reflected from the optical disc 31. Before the laser light (R1 or R2 or R3) reflected from the optical disc 31 enters the beam splitter 21, its polarization state is changed by a polarizer not shown in the drawings.

The first laser light L1 is blue laser light and the first wavelength is, for example, 0.405 μm. The second laser light L2 is red laser light and the second wavelength is, for example, 0.65 μm. The third laser light L3 is infrared laser light and the third wavelength is, for example, 0.78 μm.

The optical pickup in the first embodiment also has an optical detection system 40 that detects the laser light R1, R2, and R3 reflected from the optical disc 31. The optical detection system 40 has a cylindrical lens 41 that astigmatizes the laser light (one of R1, R2, and R3) reflected from the optical disc 31 and by the beam splitter 21, and has the diffractive optical element 42 of the first embodiment and a photodetector 43.

The optical pickup in the first embodiment also has a detection circuit 50 for performing focus control and tracking control of the objective lens 23 on the basis of detection signals output from the optical detection system 40. The detection circuit 50 has a focus error detection circuit 51 for generating a focus error detection signal on the basis of the detection signal output from the optical detection system 40, and a tracking error detection circuit 53 for generating a tracking error detection signal on the basis of the detection signal output from the optical detection system 40. The optical disc recording and reproducing device in which the optical pickup is mounted has a focus servo circuit 52 that makes the servo mechanism 24 carry out a focus servo operation on the basis of the focus error detection signal generated by the focus error detection circuit 51, and a tracking servo circuit 54 that makes the servo mechanism 24 carry out a tracking servo operation on the basis of the tracking error detection signal generated by the tracking error detection circuit 53.

Figure 2:
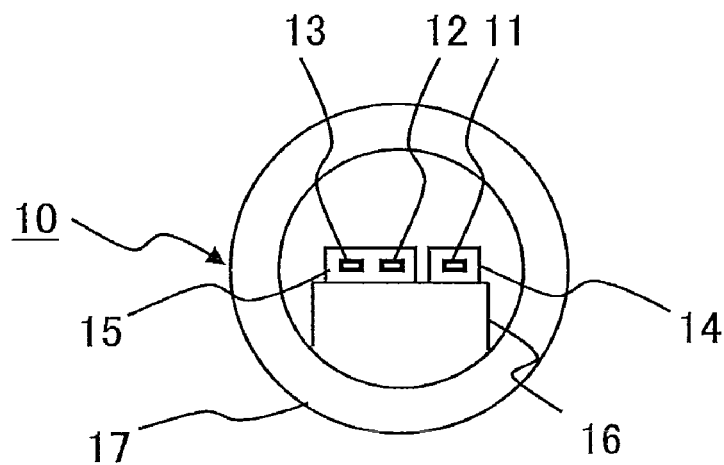
FIG. 2 is a frontal view schematically showing the semiconductor laser in the optical pickup in the first embodiment, as seen from the optical path of the laser light.

FIG. 2 is a frontal drawing that schematically shows the semiconductor laser 10 of the optical pickup in the first embodiment, as seen from the path of the laser light. As shown in FIG. 2, the semiconductor laser 10 has a first semiconductor laser element 14 including a first light source 11, a second semiconductor laser element 15 including a second light source 12 and a third light source 13, a heat sink member 16 supporting the first semiconductor laser element 14 and second semiconductor laser element 15, and a package 17 supporting the heat sink member 16. The first light source 11 of the first semiconductor laser element 14 is the lasing region of the semiconductor element. The first laser light L1 is blue laser light and the first wavelength is, for example, 0.405 μm. The second light source 12 of the second semiconductor laser element 15 is a lasing region of the semiconductor element. The second laser light L2 is red laser light and the second wavelength is, for example, 0.65 μm. The third light source 13 of the second semiconductor laser element 15 is a lasing region of the semiconductor element. The third laser light L3 is infrared laser light and the third wavelength is, for example, 0.78 μm.

Figure 3:
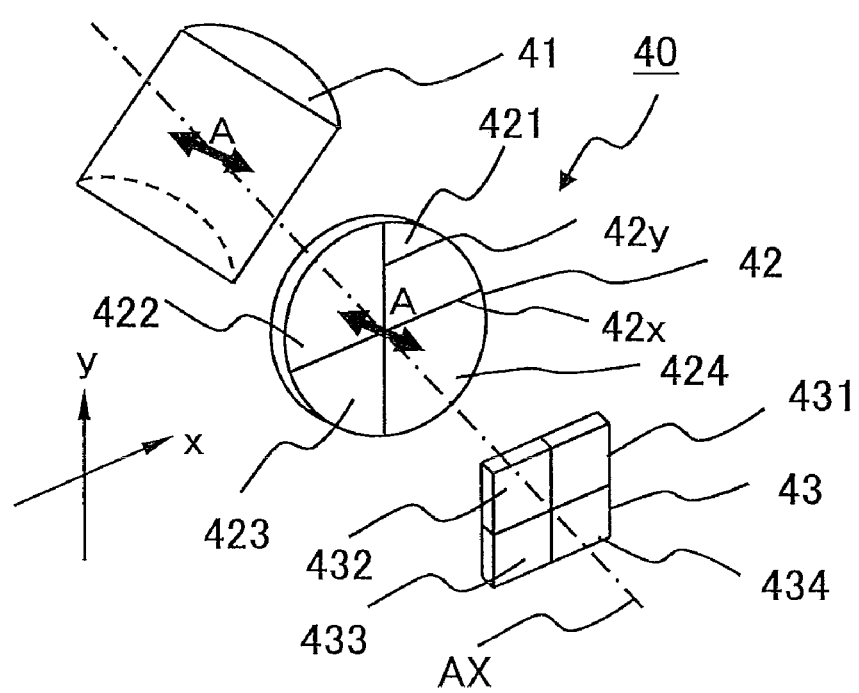
FIG. 3 is a perspective view schematically showing the structure of the optical detection system of the optical pickup in the first embodiment.

FIG. 3 is a perspective drawing schematically showing the structure of the optical detection system 40 of the optical pickup in the first embodiment. The x- and y-axes in FIG. 3 correspond to, for example, a radial direction on the optical disc 31 and a tangential direction orthogonal to the radial direction. As shown in FIG. 3, the optical detection system 40 has a cylindrical lens 41, a diffractive optical element 42, and a single photodetector 43. As shown in FIG. 3, the cylindrical lens 41 of the optical detection system 40 is a semicylindrical lens disposed so that the direction in which it has a lens effect (the direction of arrow A in FIG. 3) lies in the xy-plane at an angle of about 45° to the x-axis. As also shown in FIG. 3, the diffractive optical element 42 of the optical detection system 40 is disposed adjacent to the cylindrical lens 41 (downstream in the direction of propagation of the reflected laser light). The diffractive optical element 42 is divided into four diffraction regions 421, 422, 423, 424, by two straight lines 42x and 42y intersecting at the optical axis AX. Among the four diffraction regions 421, 422, 423, 424, the two diffraction regions 421 and 423, which are disposed in symmetrical positions with respect to the optical axis AX, have the same structure (their structure is point symmetric with respect to the optical axis AX). Among the four diffraction regions 421, 422, 423, 424, the two diffraction regions 422 and 424, which are disposed in symmetrical positions with respect to the optical axis AX, have the same structure (their structure is point symmetric with respect to the optical axis AX). As also shown in FIG. 3, the light detection region of the photodetector 43 of the optical detection system 40 is divided into four light receiving surfaces 431, 432, 433, 434 by a line 43x running straight in the x-axis direction and a line 43y running straight in the y-axis direction.

Figure 4:
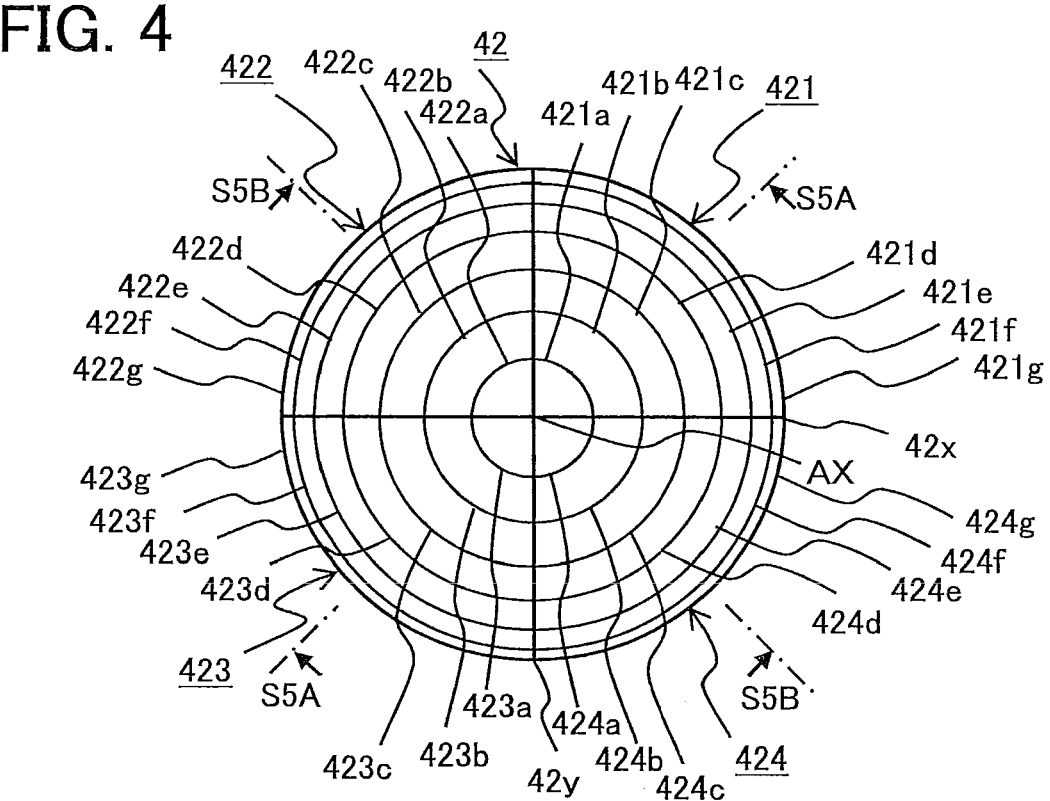
FIG. 4 is a frontal view schematically showing the structure of the diffractive optical element of the optical pickup in the first embodiment.

FIG. 4 is a frontal view schematically showing the structure of the diffractive optical element 42 of the optical pickup in the first embodiment. As shown in FIG. 4, the diffractive optical element 42 is divided by dividing lines 42x and 42y and 427 into four diffraction regions 421, 422, 423, 424. Each of the diffraction regions 421, 422, 423, 424 has a plurality of annular regions disposed in sequence from the center (the position of the optical axis AX) to the perimeter. Diffraction region 421 has, from the center toward the perimeter, annular regions 421a, 421b, 421c, 421d, 421e, 421f, 421g. Diffraction region 422 has, from the center toward the perimeter, annular regions 422a, 422b, 422c, 422d, 422e, 422f, 422g. Diffraction region 423 has, from the center toward the perimeter, annular regions 423a, 423b, 423c, 423d, 423e, 423f, 423g. Diffraction region 424 has, from the center toward the perimeter, annular regions 424a, 424b, 424c, 424d, 424e, 424f, 424g. The annular regions in positions at the same distance from the center of the diffractive optical element 42 toward the perimeter in each of the diffraction regions 421, 422, 423, 424 have the same width. Each of the diffraction regions 421, 422, 423, 424 is structured so that the width of the annular regions gradually narrows from the center of the diffractive optical element 42 toward the perimeter. In the description of this embodiment, from the center toward the perimeter, the diffraction regions have seven annular regions, but the number of annular regions is not limited to seven; the optimal number is a design choice.

Figure 5A:
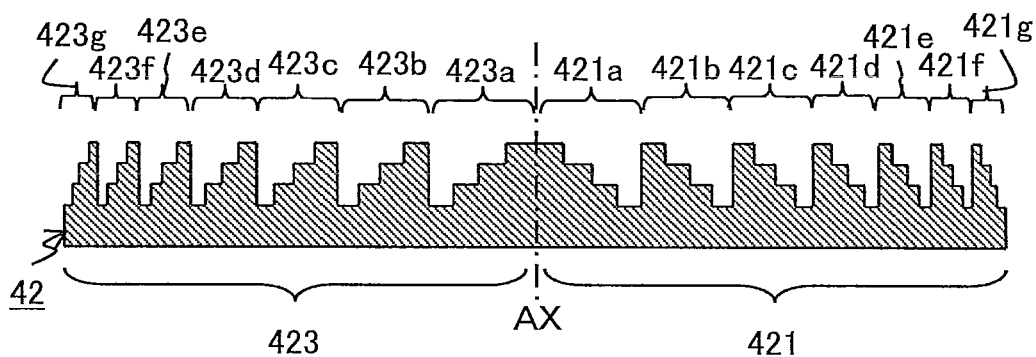
FIGS. 5(A) and 5(B) show schematic sectional views of the diffractive optical element in FIG. 4 through lines S5A-S5A and S5B-S5B, respectively.
Figure 5B:
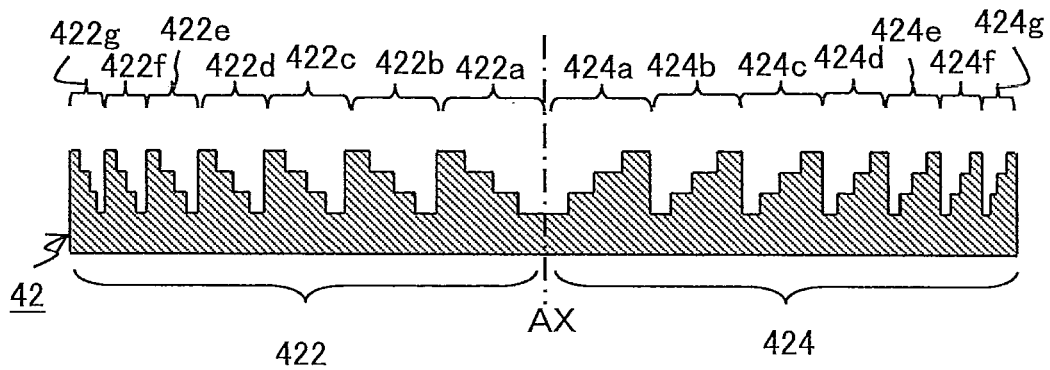

FIGS. 5(A) and 5(B) show schematic sectional views of the diffractive optical element 42 in FIG. 4 through lines S5A-S5A and S5B-S5B, respectively. As shown in FIG. 5(A), each of the annular regions 421a, 421b, 421c, 421d, 421e, 421f, 421g of diffraction region 421 is structured as a stepped diffraction grating with four steps such that the direction from the bottom toward the top of the stepped structure is the direction from the perimeter toward the center of the diffractive optical element 42 (so that in each annular region, the closer the steps are to the center, the higher they become). As also shown in FIG. 5(A), each of the annular regions 423a, 423b, 423c, 423d, 423e, 423f, 423g of diffraction region 423 is structured as a stepped diffraction grating with four steps such that the direction from the bottom toward the top of the stepped structure is the direction from the perimeter toward the center of the diffractive optical element 42 (so that in each annular region, the closer the steps are to the center, the higher they become). As shown in FIG. 5(B), each of the annular regions 422a, 422b, 422c, 422d, 422e, 422f, 422g of diffraction region 422 is structured as a stepped diffraction grating with four steps such that the direction from the top toward the bottom of the stepped structure is the direction from the perimeter toward the center of the diffractive optical element 42 (so that in each annular region, the closer the steps are to the center, the lower they become). As also shown in FIG. 5(B), each of the annular regions 424a, 424b, 424c, 424d, 424e, 424f, 424g of diffraction region 424 is structured as a stepped diffraction grating with four steps such that the direction from the top toward the bottom of the stepped structure is the direction from the perimeter toward the center of the diffractive optical element 42 (so that in each annular region, the closer the steps are to the center, the lower they become). The steps in each diffraction region have identical heights. The diffraction grating in each diffraction region 421, 422, 423, 424 is structured so that the width of its grooves becomes more narrow as the grooves become farther from the center of the diffractive optical element 42 (the optical axis AX).

FIG. 6 is a drawing illustrating the function of a diffractive optical element having stepped grooves. The diffractive optical element 70 shown in FIG. 6 is a diffractive optical element having stepped grooves; the diffractive optical element 42 in the first embodiment has a structure functionally equivalent to the diffractive optical element 70 shown in FIG. 6. Let P70 be the width of the grating grooves (the groove width) of the diffractive optical element 70 shown in FIG. 6, and let D70 be the depth of the grating grooves. Incidence of laser light on a diffraction grating generally gives rise to 0-order light (also referred to as '0-order diffracted light'), which is the component that passes straight through without experiencing a diffraction effect, +1-order light (also referred to as '+1-order diffracted light') and −1-order light (also referred to as '−1-order diffracted light'), which are the maximal components that experience a diffraction effect and change in direction, and second-order and higher-order diffracted light. A characteristic of a diffractive optical element 70 with a stepped diffraction grating is that the +1-order diffracted light and −1-order diffracted light have different intensities; as shown in FIG. 6, when the direction from the bottom 70a to the top 70b of the grating grooves is the direction toward the lower right of the drawing sheet of FIG. 6, the intensity of the −1-order light, which is the maximum component directed toward the lower right of the drawing sheet of FIG. 6, tends to be higher than the intensity of the +1-order light, which is the maximum component directed toward the upper right of the drawing sheet of FIG. 6. The intensity of the 0-order, +1-order, and −1-order light can be varied depending on the depth D70 of the grating grooves. The diffraction angle θ of the +1-order and −1-order light is in inverse proportion to the grating period P70; the diffraction angle θ can be increased by reducing the period P70. This characteristic of the stepped diffractive optical element 70 can be used to produce a lens-like effect.

Figure 7:
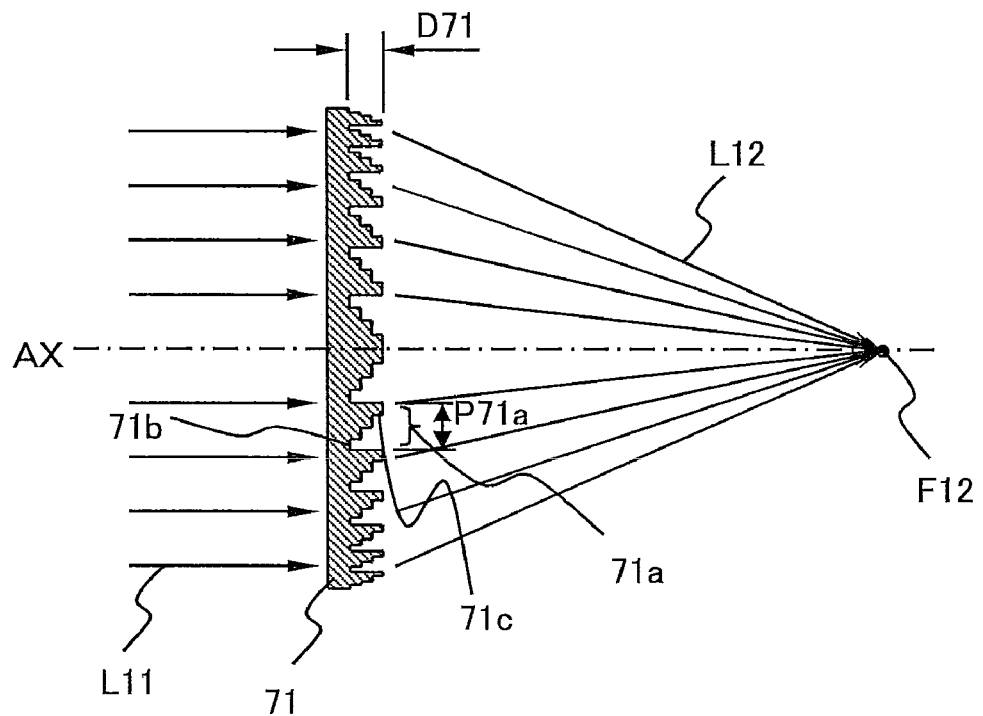
FIG. 7 is a sectional view showing an exemplary diffractive optical element having stepped grooves.

FIG. 7 is a sectional view showing an exemplary diffractive optical element having stepped grooves. In the diffractive optical element 71 shown in FIG. 8, stepped grating grooves are formed in annuli, centered on the optical axis AX, so that in each annular region (e.g., 71a) the bottom 71b of the grating groove is outward of the top 71c of the grating groove. They are furthermore formed so that, proceeding toward the perimeter, the width (e.g., P71a) of the annular regions (e.g., 71a) narrows. When a parallel laser beam L11 is incident on this type of diffractive optical element 71, the component of the diffracted light L12 directed toward the optical axis AX can be increased. If the width (e.g., P71a) of the annular regions (e.g., 71a) is adjusted, the diffracted light L12 can be made to converge to a point F12. If the depth D71 of the grating grooves is adjusted for a particular wavelength, the 0-order light and the higher-order diffracted light, starting from orders +2 and −2 can be reduced to substantially zero, so that only the +1-order and −1-order components of the light are present. When the width (e.g., P71A) of the annular regions (e.g., 71a) and the depth D of the grating grooves are optimized to particular values in this way, the diffractive optical element 71 has the same function as a convex lens that can focus light to the convergence point F12.

Figure 8:
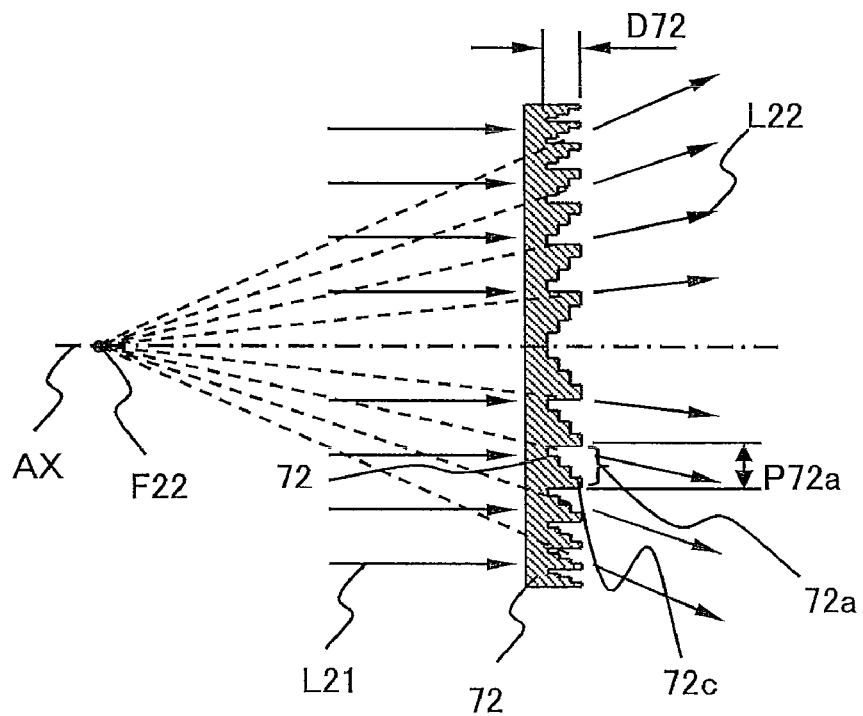
FIG. 8 is a sectional view showing another exemplary diffractive optical element having stepped grooves.

FIG. 8 is a sectional view showing an exemplary diffractive optical element having stepped grooves. In the diffractive optical element 72 shown in FIG. 8, stepped grating grooves are formed in annuli, centered on the optical axis AX, so that in each annular region (e.g., 72a) the bottom 72b of the grating groove is inward of the top 72c of the grating groove. They are furthermore formed so that, proceeding toward the center, the width (e.g., P72a) of the annular regions (e.g., 72a) narrows. When a parallel laser beam L21 is incident on this type of diffractive optical element 72, the component of the diffracted light L22 directed toward the optical axis AX can be increased. If the width (e.g., P72a) of the annular regions (e.g., 72a) is adjusted, the diffracted light L22 can be made to diverge as if from a particular imaginary point F22. If the depth D72 of the grating grooves is adjusted for a particular wavelength, the 0- order light and the higher-order diffracted light, starting from orders +2 and −2, can be reduced to substantially zero, so that only the +1-order and −1-order components of the light are present. When the width (e.g., P72a) of the annular regions (e.g., 72a) and the depth D of the grating grooves are optimized to particular values in this way, the diffractive optical element 72 has the same function as a concave lens that can diverge light from point F22.

In the diffractive optical element 42 of the first embodiment, diffraction regions 421 and 423 have a structure similar to that shown in FIG. 7, and diffraction regions 422 and 424 have a structure similar to that shown in FIG. 8.

In the optical pickup in the first embodiment, the emitted laser light (L1 or L2 or L3) passes through the beam splitter 21 and is converted to a parallel beam by the collimator lens 22, and a beam spot is formed on the optical disc 31 by the objective lens 23 to record or reproduce information. The laser light (R1 or R2 or R3) reflected from the optical disc 31 passes through the objective lens 8, then through the collimator lens 22, is reflected in the beam splitter 21, and passes through the cylindrical lens 41. In the well-known astigmatic method of focus error detection, the cylindrical lens 41 has the effect of astigmatizing the laser beam. The astigmatized laser light enters the diffractive optical element 42. The diffractive optical element 42 has the function of acting on the laser light either by producing a diffractive effect or by passing the laser light through without diffraction. The laser light exiting the diffractive optical element 42 is received by the photodetector 43. The photodetector 43 detects not only the signal to be reproduced from the optical disc 31 but also signals necessary for focus control and tracking control.

FIG. 9 is a table of optical disc specifications. For each optical disc standard, FIG. 9 shows the center wavelength, the numerical aperture of the objective lens, the depth of focus calculated from the center wavelength and the numerical aperture, and the depth of focus ratio, which is the ratio of the depth of focus in the other standards, referenced to the depth of focus in the CD standard. As shown in FIG. 9, the depth of focus in the DVD standard (also referred to as the 'red DVD' standard because of the use of red laser light) is about half the depth of focus in the CD standard, and the depth of focus in the blue laser optical disc standards is less than half the depth of focus in the DVD standard. The depth of focus in the Blu-ray standard, which has the highest density, is about ⅐ of the depth of focus in the CD standard, which has the lowest density; because of these relations, it is extremely difficult to set a linear range of the focus error signal that simultaneously satisfies all of the standards.

In this situation, in regard to performance aspects, the best mode can be obtained by constructing a separate optical detection system and performing optimal detection of the focus error signal and setting of the linear range separately for each of the optical disc standards. However, in regard to manufacturing and cost aspects, this structure has a disadvantage in that the detection optical system is too complex to be structured as a single unit, making it more expensive. Therefore, if the aspects of performance, manufacturing, and cost are all taken into consideration, the best mode is a single optical detection system that can perform focus control for both the high-density blue laser optical disc standards and the CD standard, which has the lowest density.

FIG. 10 is a table showing the depth of focus ratio in the optical disc specifications and design strategies for the linear range of the focus error signal in the optical pickup according to the first embodiment. Specifically, to perform focus control for both the high-density blue laser optical disc standards and the CD standard, which has the lowest density, the linear range for one of the standards must differ from that of the other standards. Two strategies are available. In design strategy one, the blue laser optical disc standard has its own linear range, while the DVD standard and CD standard share the same linear range. In design strategy two, the CD standard has its own linear range, while Blu-ray standard and HD-DVD standard share the same linear range.

Figure 11A:
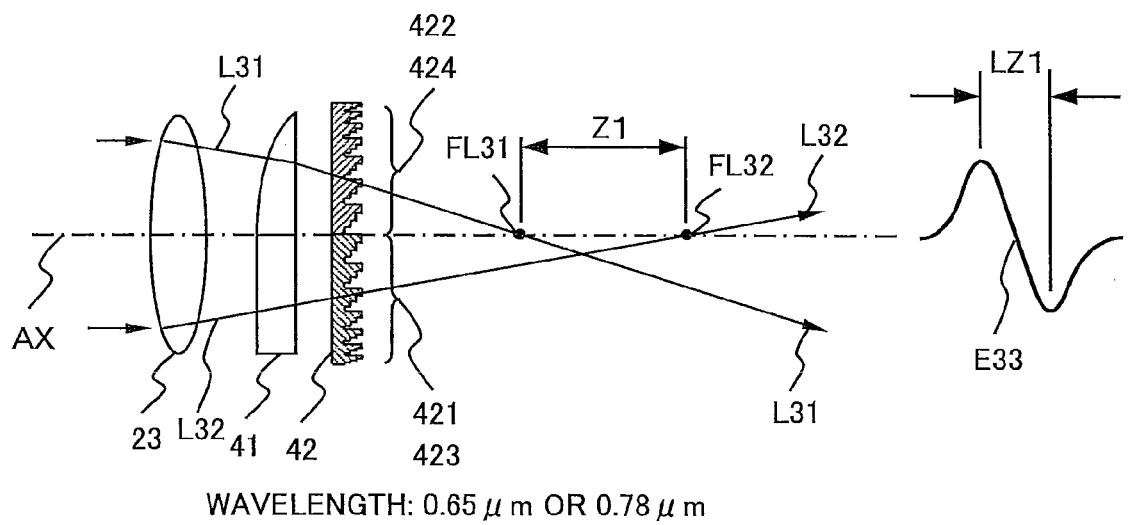
FIGS. 11(A) and 11(B) relate to the optical pickup (design strategy one) according to the first embodiment, FIG. 11(A) being a drawing showing the optical path and focus error signal for the DVD standard and the CD standard, FIG. 11(B) being a drawing showing the optical path and focus error signal for a blue laser disc standard.
Figure 11B:
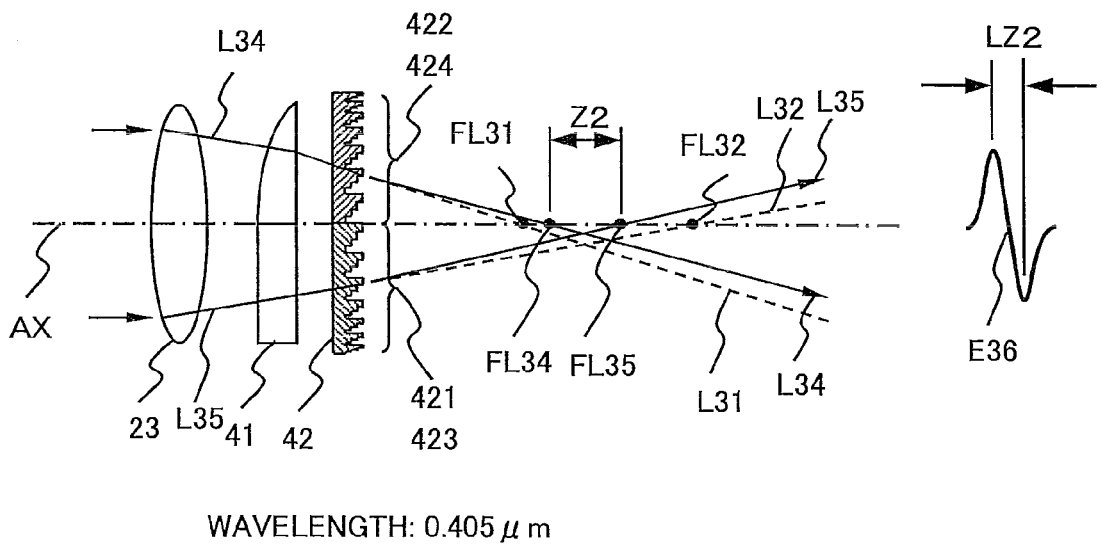

The case of design strategy one in FIG. 10 will now be described. FIGS. 11(A) and 11(B) relate to the optical pickup (design strategy one) according to the first embodiment, FIG. 11(A) being a drawing showing the optical path and focus error signal for the DVD standard and the CD standard, FIG. 11(B) being a drawing showing the optical path and focus error signal for a blue laser disc standard. In the waveforms of the focus error signal in FIG. 11(A) and FIG. 11(B), the horizontal direction represents the amount of focus error, while the vertical direction represents the amplitude of the focus error detection signal. In both FIGS. 11(A) and 11(B), the operation in the direction in which the cylindrical lens 41 has a lens effect (the direction of arrow A in FIG. 3) is shown above the optical axis AX, while the operation in the direction in which the diffractive optical element 42 has no lens effect (the direction perpendicular to arrow A in FIG. 3) is shown below the optical axis AX. Diffraction regions 422 and 424 of the diffractive optical element 42 are disposed behind the cylindrical lens 41 in the direction in which it has a lens effect; diffraction regions 421 and 423 of the diffractive optical element 42 are disposed behind the cylindrical lens 41 in the direction in which has no lens effect.

In FIG. 11(A), laser light L31 with a wavelength of 0.65 μm or 0.78 μm incident in the direction in which the cylindrical lens 41 has a lens effect is refracted by the lens effect of the cylindrical lens 41, then enters diffraction regions 422 and 424 of the diffractive optical element 42. The depth of the grating grooves in the diffractive optical element 42 is optimized so as to generate only 0-order light from light with wavelengths of 0.65 μm and 0.78 μm. Therefore, the laser light L31 passes through the diffractive optical element 42 without experiencing its diffractive effect, and converges to the optical axis AX at point FL31. Laser light 32 with a wavelength of 0.65 μm or 0.78 μm incident in the direction in which the cylindrical lens 41 has no lens effect passes through the cylindrical lens 41 without experiencing the lens effect of the cylindrical lens 41, and enters diffraction regions 421 and 423 of the diffractive optical element 42. Since the depth of the grating grooves of the diffractive optical element 42 is optimized so as to generate only 0-order light from light with wavelengths of either 0.65 μm and 0.78 μm, the laser light L32 passes through the diffractive optical element 42 without experiencing its diffractive effect and converges to the optical axis AX at point FL32. The distance Z1 between points FL31 and FL32 corresponds to the linear range of the focus error signal; a focus error signal having a linear range LZ1 as shown in waveform E33 is obtained.

Similarly, in FIG. 11(B), laser light L34 with a wavelength of 0.405 μm incident in the direction in which the cylindrical lens 41 has a lens effect is refracted by the lens effect of the cylindrical lens 41, and enters diffraction regions 422 and 424 of the diffractive optical element 42. The depth and step direction of the grating grooves in the diffractive optical element 42 is optimized so as to generate only −1-order light from light with a wavelength of 0.405 μm. Therefore, the laser light L34 is diffracted by the diffractive effect of the diffractive optical element 42, and converges to the optical axis AX at a point FL34 behind point FL31. Laser light L35 with a wavelength of 0.405 μm incident in the direction in which the cylindrical lens 41 has no lens effect passes through the cylindrical lens 41 without experiencing the lens effect of the cylindrical lens 41, and enters diffraction regions 421 and 423 of the diffractive optical element 42. Since the depth and step direction of the grating grooves of the diffractive optical element 42 and the direction of their steps is optimized so as to generate only −1-order light from light with a wavelength of 0.405 μm, laser light L35 is diffracted by the diffractive effect of the diffractive optical element 42 and converges to the optical axis AX at a point FL35 in front of point FL32. The distance Z2 between points FL34 and FL35 corresponds to the linear range of the focus error signal; a focus error signal having a linear range LZ2 as shown in waveform E36 is obtained.

The relation Z1>Z2, that is, LZ1>LZ2, is obtained by the above operations, so an independent linear range LZ2 can be set for the blue laser optical disc standards, which have a wavelength of 0.405 μm, and a shared linear range LZ1 can be set for the DVD standard and the CD standard.

Figure 12A:
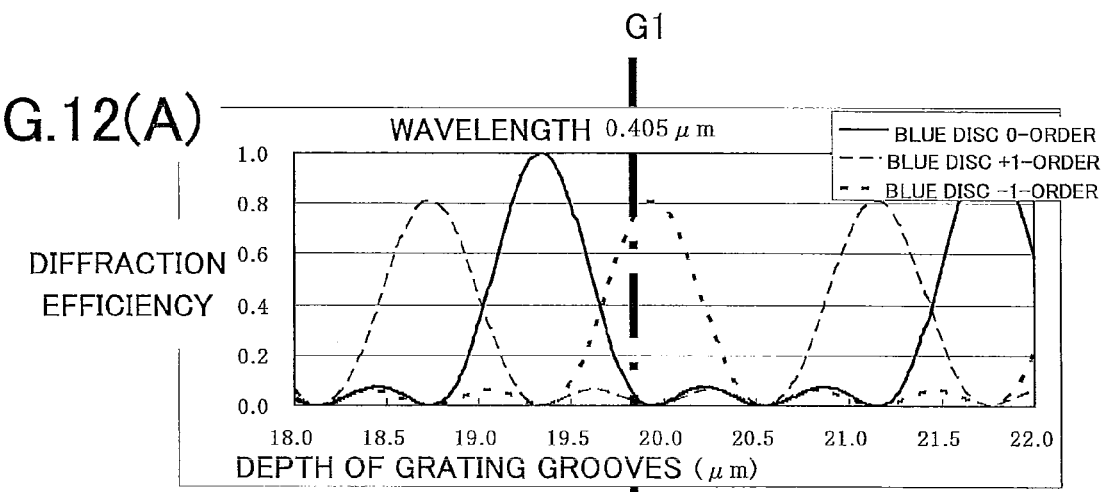
FIGS. 12(A) to 12(C) relate to the optical pickup (design strategy one) according to the first embodiment, FIG. 12(A) showing the diffraction efficiency of 0-order light, +1-order light, and −1-order light for laser light with a 0.405-μm wavelength, FIG. 12(B) showing the diffraction efficiency of 0-order light, +1-order light, and −1-order light for laser light with a 0.65-μm wavelength, FIG. 12(C) showing the diffraction efficiency of 0-order light, +1-order light, and −1-order light for laser light with a 0.78-μm wavelength.
Figure 12B:
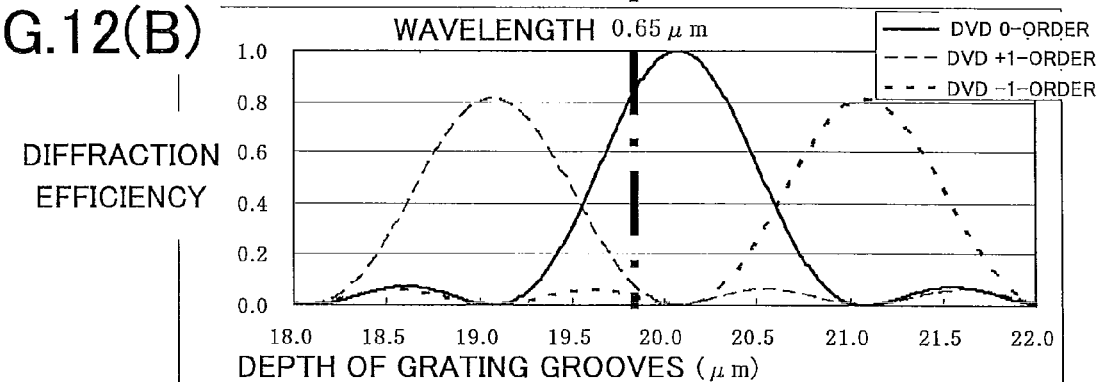
Figure 12C:
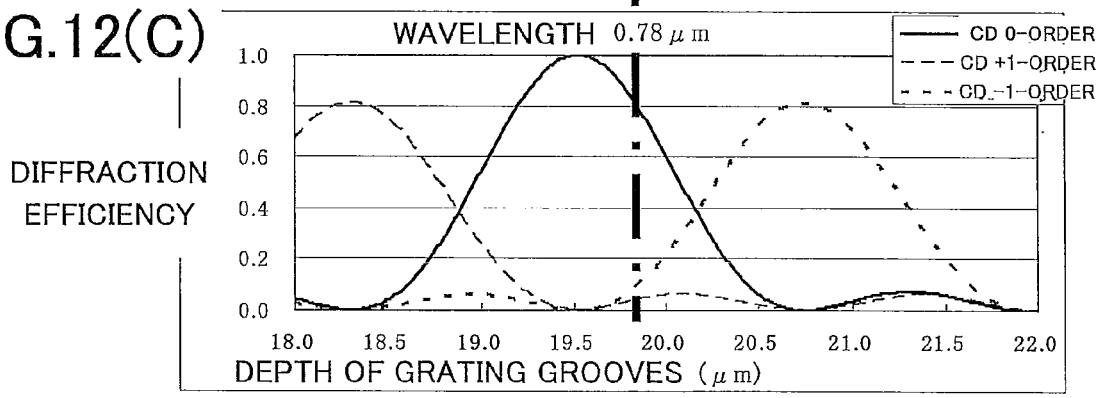

FIGS. 12(A) to 12(C) relate to the optical pickup (design strategy one) according to the first embodiment, FIG. 12(A) showing the diffraction efficiency of 0-order light, +1-order light, and −1-order light for laser light with a 0.405-μm wavelength, FIG. 12(B) showing the diffraction efficiency of 0-order light, +1-order light, and −1-order light for laser light with a 0.65-μm wavelength, FIG. 12(C) showing the diffraction efficiency of 0-order light, +1-order light, and −1-order light for laser light with a 0.78-μm wavelength. The diffraction efficiency calculation at each wavelength is based on the refractive index of an acrylic diffractive optical element 42. Consider the case G1 in which the depth of the grating grooves is about 19.8 μm. Only −1-order light is generated from light with a wavelength of 0.405 μm, while substantially only 0-order light is generated from light with wavelengths of 0.65 μm and 0.78 μm, so the requisite diffractive optical element for achieving the operation described with reference to FIGS. 11(A) and (B) can be obtained. The values given above for the depth of the grating grooves and their number of steps are exemplary design values that do not limit the scope of the invention; other values may be used.

Furthermore, in the above description, the linear range setting is based on design strategy one in FIG. 10, but it may be based on design strategy two in FIG. 10.

Figure 13A:
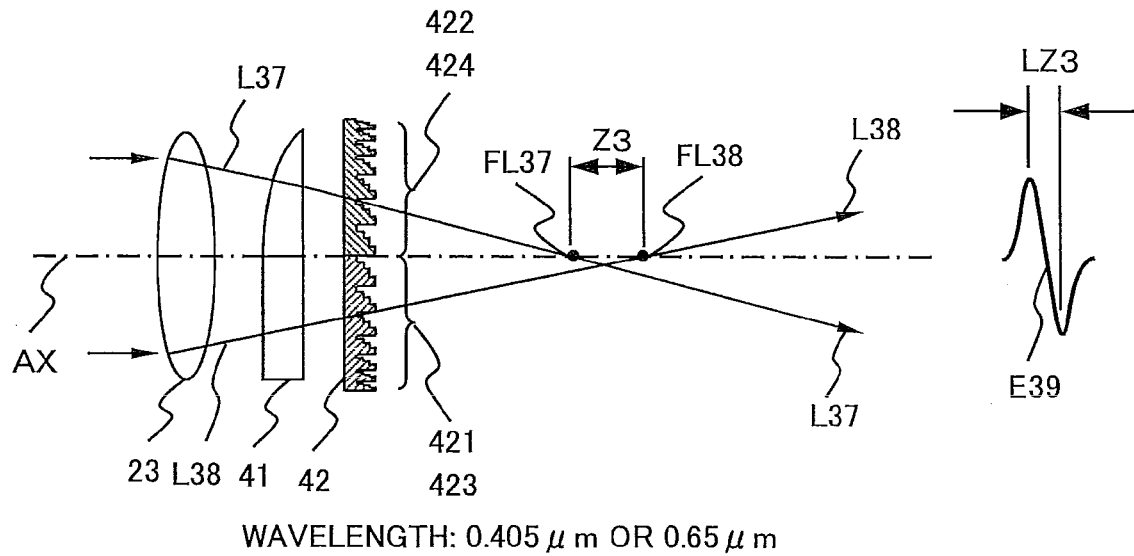
FIGS. 13(A) and 13(B) relate to the optical pickup (design strategy two) according to the first embodiment, FIG. 13(A) being a drawing showing the optical path and focus error signal for a blue laser disc standard and the DVD standard and the CD standard, FIG. 13(B) being a drawing showing the optical path and focus error signal for the CD standard.
Figure 13B:
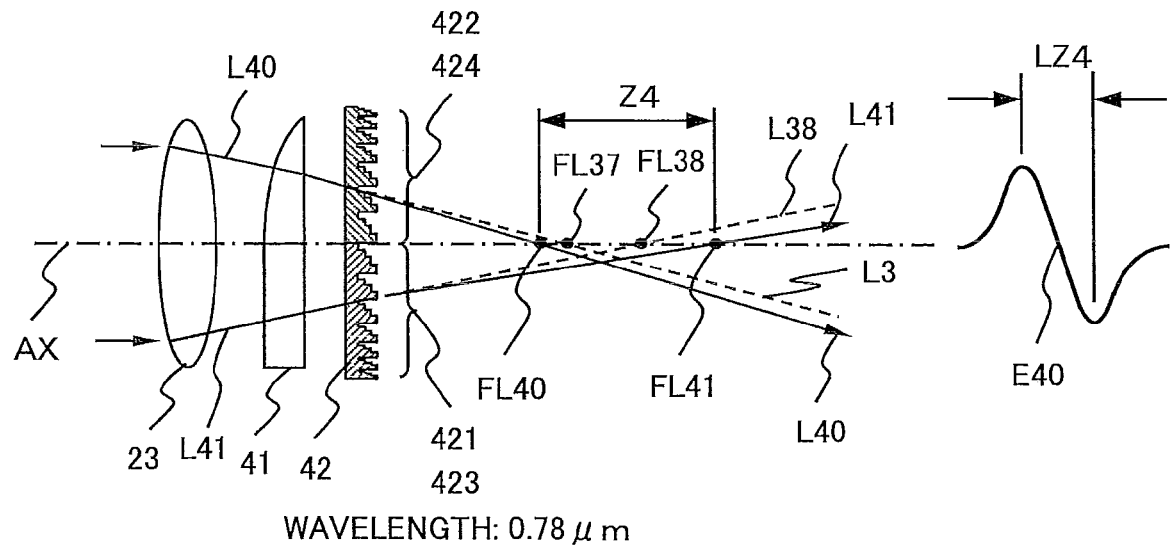

FIGS. 13(A) and 13(B) relate to the optical pickup (design strategy two) according to the first embodiment, FIG. 13(A) being a drawing showing the optical path and focus error signal for a blue laser disc standard and the DVD standard, FIG. 13(B) being a drawing showing the optical path and focus error signal for the CD standard. In the waveforms of the focus error signal in FIGS. 13(A) and 13(B), the horizontal direction represents the amount of focus error, while the vertical direction represents the amplitude of the focus error detection signal. In both FIGS. 13(A) and 13(B), the operation in the direction in which the cylindrical lens 41 has a lens effect (the direction of arrow A in FIG. 3) is shown above the optical axis AX, while the operation in the direction in which the cylindrical lens 41 has no lens effect (the direction perpendicular to arrow A in FIG. 3) is shown below the optical axis AX. Diffraction regions 422 and 424 of the diffractive optical element 42 are disposed behind the cylindrical lens 41 in the direction in which it has a lens effect; diffraction regions 421 and 423 of the diffractive optical element 42 are disposed behind the cylindrical lens 41 in the direction in which has no lens effect.

In FIG. 13(A), laser light L37 with a wavelength of 0.405 μm or 0.65 μm incident in the direction in which the cylindrical lens 41 has a lens effect is refracted by the lens effect of the cylindrical lens 41, then enters diffraction regions 422 and 424 of the diffractive optical element 42. The depth of the grating grooves in the diffractive optical element 42 is optimized so as to generate only 0-order light from light with wavelengths of 0.405 μm and 0.65 μm. Therefore, the laser light L37 passes through the diffractive optical element 42 without experiencing its diffractive effect, and converges to the optical axis AX at point FL37. Laser light L38 with a wavelength of 0.405 μm or 0.65 μm incident in the direction in which the cylindrical lens 41 has no lens effect passes through the cylindrical lens 41 without experiencing the lens effect of the cylindrical lens 41, and enters diffraction regions 421 and 423 of the diffractive optical element 42. Since the depth of the grating grooves of the diffractive optical element 42 is optimized so as to generate only 0-order light from light with wavelengths of 0.405 μm and 0.65 μm, the laser light L38 passes through the diffractive optical element 42 without experiencing its diffractive effect and converges to the optical axis AX at point FL38. The distance Z3 between points FL37 and FL38 corresponds to the linear range of the focus error signal; a focus error signal having a linear range LZ3 as shown in waveform E39 can be obtained.

Similarly, in FIG. 13(B), laser light L40 with a wavelength of 0.78 μm incident in the direction in which the cylindrical lens 41 has a lens effect is refracted by the lens effect of the cylindrical lens 41, and enters diffraction regions 422 and 424 of the diffractive optical element 42. The depth and step direction of the grating grooves in the diffractive optical element 42 is optimized so as to generate only −1-order light from light with a wavelength of 0.78 μm. Therefore, the laser light L40 is diffracted by the diffractive effect of the diffractive optical element 42, and converges to the optical axis AX at a point FL40 behind point FL37. Laser light L40 with a wavelength of 0.78 μm incident in the direction in which the cylindrical lens 41 has no lens effect passes through the cylindrical lens 41 without experiencing the lens effect of the cylindrical lens 41, and enters diffraction regions 421 and 423 of the diffractive optical element 42. The depth and step direction of the grating grooves of the diffractive optical element 42 is optimized so as to generate only −1-order light from light with a wavelength of 0.78 μm, so laser light L41 is diffracted by the diffractive effect of the diffractive optical element 42, and converges to the optical axis AX at a point FL41 in front of point FL38. The distance Z4 between the points FL40 and FL41 corresponds to the linear range of the focus error signal; a focus error signal having a linear range of LZ4 as shown in waveform E40 is obtained.

The relation Z3<Z4, that is, LZ3<LZ4, is obtained by the above operations, so an independent linear range LZ4 can be set for the CD standard, which has a wavelength of 0.78 μm, and a shared linear range LZ3 can be set for the blue laser optical disc standards and the DVD standard.

Figure 14A:
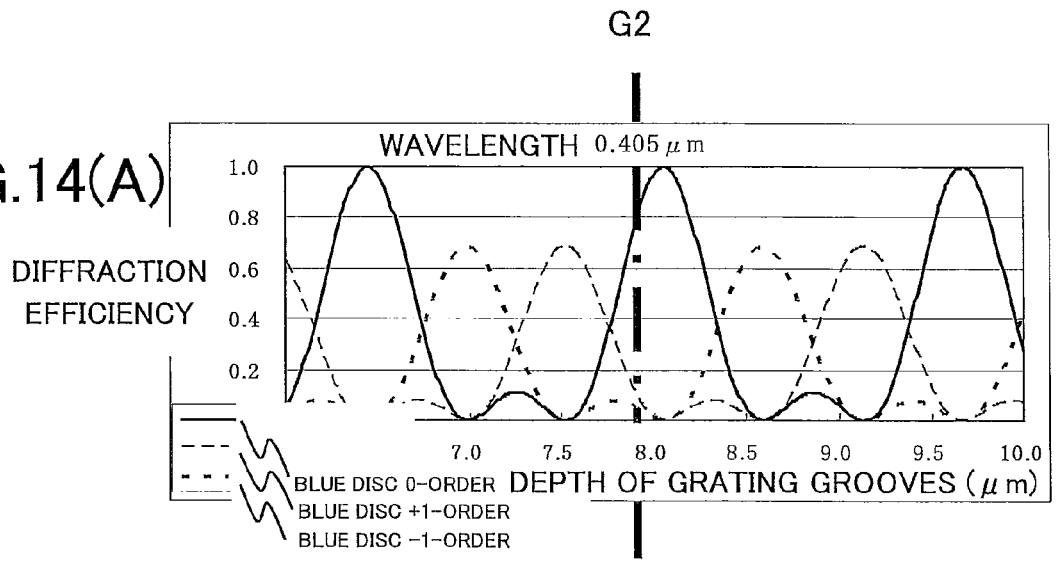
FIGS. 14(A) to 14(C) relate to the optical pickup (design strategy two) according to the first embodiment, FIG. 14(A) showing the diffraction efficiency of 0-order light, +1-order light, and −1-order light for laser light with a 0.405-μm wavelength, FIG. 14(B) showing the diffraction efficiency of 0-order light, +1-order light, and −1-order light for laser light with a 0.65-μm wavelength, FIG. 14(C) showing the diffraction efficiency of 0-order light, +1-order light, and −1-order light for laser light with a 0.78-μm wavelength.
Figure 14B:
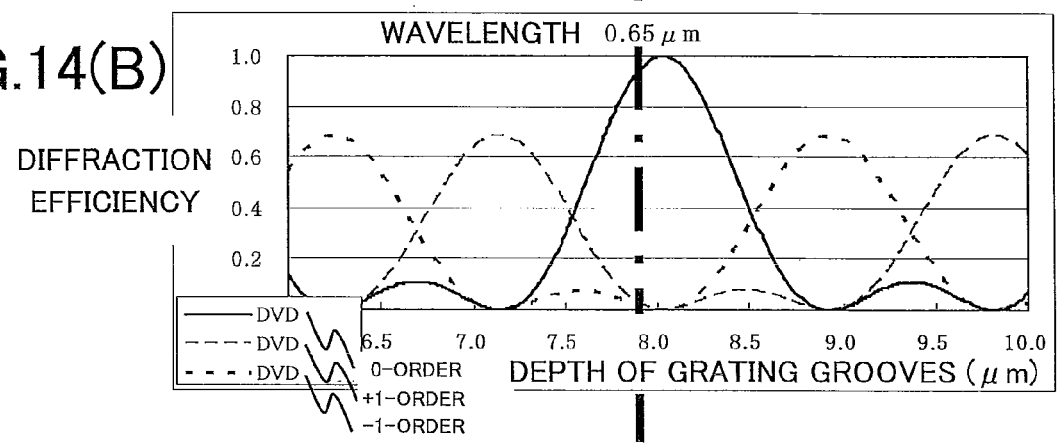
Figure 14C:
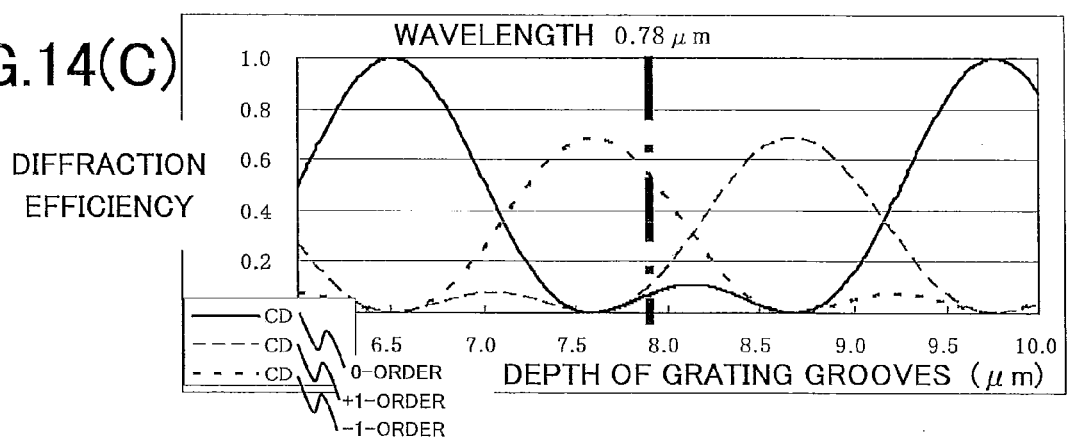

FIGS. 14(A) to 14(C) relate to the optical pickup (design strategy two) according to the first embodiment, FIG. 14(A) showing the diffraction efficiency of 0-order light, +-order light, and −1-order light for laser light with a 0.405-μm wavelength, FIG. 14(B) showing the diffraction efficiency of 0-order light, +1-order light, and −1-order light for laser light with a 0.65μm wavelength, FIG. 14(C) showing the diffraction efficiency of 0-order light, +1-order light, and −1-order light for laser light with a 0.78μm wavelength. The diffraction efficiency calculation at each wavelength is based on the refractive index of an acrylic diffractive optical element 42. Consider the case G1 in which the depth of the grating grooves is about 19.8 μm. Substantially only 0-order light is generated for light with wavelengths of 0.405 μm and 0.65 μm, while only −1-order light is generated for light with a wavelength of 0.78 μm, so the requisite diffractive optical element for achieving the operation described with reference to FIGS. 13(A) and 13(B) can be obtained. The values given above for the depth of the grating grooves and their number of steps are exemplary design values that do not limit the scope of the invention; other values may be used.

According to the diffractive optical element 42 in the first embodiment, 0-order light can be made the maximal component of the diffracted light generated from each of two of three types of laser light, the two having close wavelengths, and +1-order or −1-order light can be made the maximal component of the diffracted light generated from the remaining one type of laser light. By use of the optical element according to the first embodiment, it is possible to use 0-order diffracted light for two of three types of laser light, the two having close wavelengths, and to use +1-order or −1-order light for the remaining one type of laser light.

According to the optical pickup in the first embodiment, by use of the above diffractive optical element 42, it is possible, according to the type of optical disc 31, to direct 0-order light onto the photodetector for two of three types of light, the two having close wavelengths, and to direct +1-order or −1-order light onto the same photodetector for the remaining one type of laser light. Therefore, according to the optical pickup of the first embodiment, diffracted light from three types of laser light can be directed efficiently onto a single photodetector according to the type of optical disc, and appropriate focus control can be obtained based on the signals detected by the photodetector. Because there is only one photodetector, the structure of the optical pickup can also be simplified and an inexpensive optical pickup can be provided.

In the above description, the diffractive optical element 42 has stepped grating grooves, but an element having blazed grating grooves with uniformly sloping surfaces may be used.

The cylindrical lens 41 in the first embodiment has a shape with a uniform convex or concave surface, but a flat Fresnel lens may be used.

In the optical detection system 40 in the first embodiment, the cylindrical lens 41 and the diffractive optical element 42 are separate elements, but they may be integrated, by forming the diffractive optical element 42 on the flat surface of the cylindrical lens 41, for example. If the cylindrical lens 41 is a flat Fresnel lens as noted above, it can be integrated with the diffractive optical element 42 even more easily.

In the optical detection system 40 in the first embodiment, the cylindrical lens 41 and the diffractive optical element 42 are separate elements, but a hologram structure may be used which integrates the functions of the cylindrical lens 41 and the diffractive optical element 42 onto a single surface.

In the optical detection system 40 according to the first embodiment, the well-known astigmatic method of detecting focus error is used, but the invention is not limited to the astigmatic method or structure of the optical detection system 40, provided that the focus error detection method uses a diffractive optical element that diffracts only a particular wavelength to produce a linear range of the focus error signal that is different from the linear range for wavelengths that are not diffracted.

Second Embodiment

Figure 15:
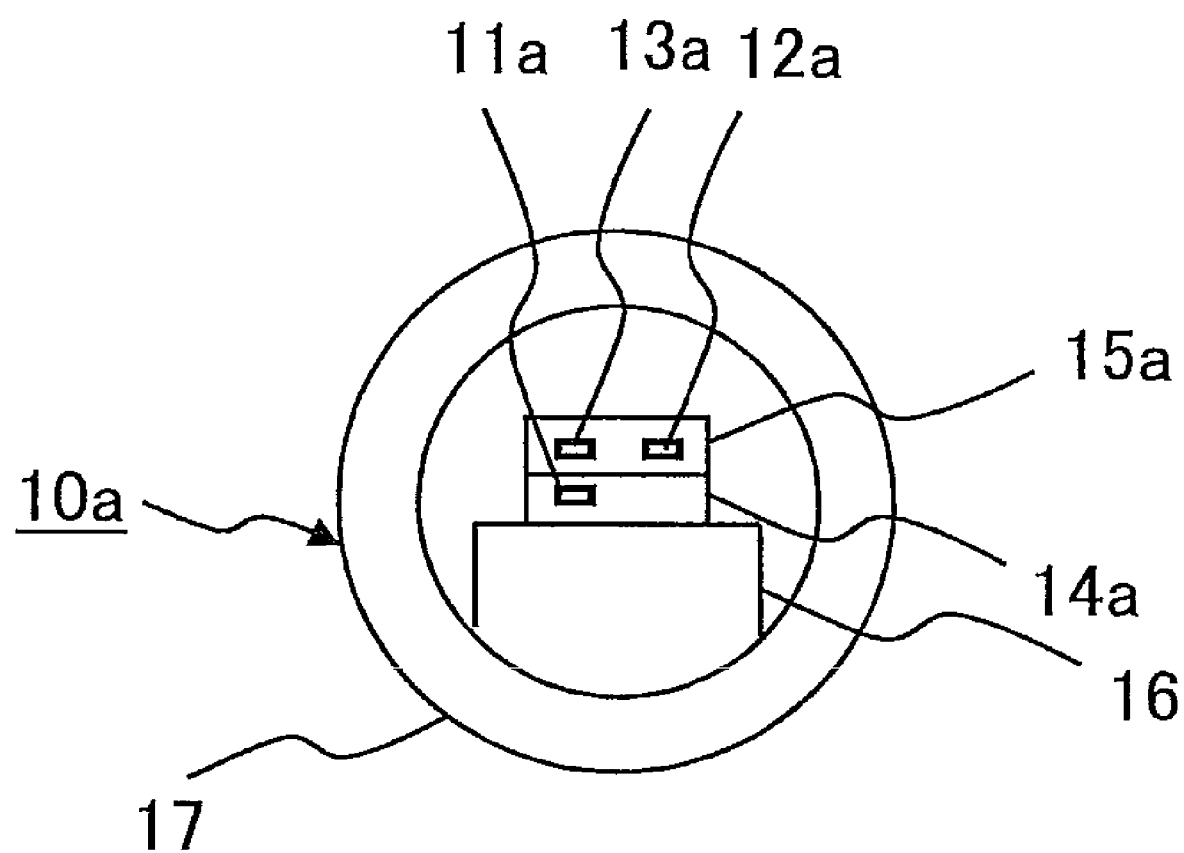
FIG. 15 is a frontal view schematically showing the semiconductor laser in the optical pickup in a second embodiment of the invention, as seen from the optical path of the laser light.

FIG. 15 is a frontal view showing another semiconductor laser 10a that can be used in an optical pickup according to a second embodiment of the invention. Although FIG. 2 showed a semiconductor laser 10 having three light sources 11, 12 and 13 arranged in one line on the heat sink member 16, as shown in FIG. 15, a structure in which a first semiconductor laser element 14a and a second semiconductor laser element 15a are stacked on the heat sink member 16 may also be used. In the example shown, the second semiconductor laser element 15a has two lasing regions, but the invention is not limited to this structure; three semiconductor laser elements may be used. Aside from the above points, the optical pickup in the second embodiment is identical to the optical pickup in the first embodiment above.

What is claimed is:

1. An optical pickup comprising:
a laser light source for emitting first laser light having a first wavelength as a center wavelength, second laser light having a second wavelength longer than the first wavelength as a center wavelength, and third laser light having a third wavelength longer than the second wavelength as a center wavelength;
an objective lens for focusing the first laser light, the second laser light, and the third laser light onto the optical disc;
a servo mechanism for changing the position of the objective lens;
an optical element disposed on a light path of laser light reflected from an optical disc onto which one of the first laser light, the second laser light, and the third laser light is directed, the optical element astigmatizing the first to third laser lights;
a diffractive optical element for causing one specific laser light or two specific laser lights of the first to third laser lights astigmatized by the optical element to diffract in specific diffraction angles; and
a photodetector for detecting the first diffracted light as a diffracted light of the first laser light that exits the diffractive optical element, the second diffracted light as a diffracted light of the second laser light that exits the diffractive optical element, and the third diffracted light as a diffracted light of the third laser light that exits the diffractive optical element,
wherein the diffractive optical element has:
a first diffractive region and a second diffractive region which are different to each other and are formed by dividing the diffractive optical element by a straight line intersecting at an optical axis of the diffractive optical element; and
the first diffractive region and the second diffractive region are structured so that the +1-order light output from the first diffractive region when laser light is incident on the first diffractive region propagates in a different direction from the +1-order light output from the second diffractive region when the same laser light is incident on the second diffractive region, and the −1-order light output from the first diffractive region when laser light is incident on the first diffractive region propagates in a different direction from the −1-order light output from the second diffractive region when the same laser light is incident on the second diffractive region.

2. The optical pickup of claim 1, wherein
the diffractive optical element outputs, when the first laser light is incident, the first diffracted light, outputs, when the second laser light is incident, the second diffracted light, and outputs, when the third laser light is incident, the third diffracted light, and
the diffractive optical element is structured so that 0-order light is a maximal component of each of the first diffracted light and the second diffracted light and +1-order light or −1-order light is a maximal component of the third diffracted light, or so that 0-order light is a maximal component of each of the second diffracted light and the third diffracted light and +1-order light or −1-order light is a maximal component of the first diffracted light.

3. The optical pickup of claim 1, wherein:
the first laser light is blue laser light;
the second laser light is red laser light; and
the third laser light is infrared laser light.

4. The optical pickup of claim 1, wherein:
the first wavelength is 0.405 µm;
the second wavelength is 0.65 µm; and
the third wavelength is 0.78 µm.

5. The optical pickup of claim 1, wherein:
the diffractive optical element is divided into four diffraction regions by two straight lines intersecting at the optical axis of the optical means;
said first diffractive region consists of two of the four diffractive regions, disposed in symmetrical positions with respect to said optical axis; and
said second diffractive region consists of another two of the four diffractive regions.

6. The optical pickup of claim 1, wherein the optical means has an optical member with a plurality of stepped diffraction grating grooves.

7. The optical pickup of claim 6, wherein the diffraction grating grooves are annular grooves centered on the optical axis of the optical means.

8. The optical pickup of claim 6, wherein the diffraction grating grooves have widths that narrow with increasing distance from the optical axis of the optical means.

9. The optical pickup of claim 6, wherein the diffraction grating grooves have widths and depths selected so that the 0-order light is the maximal component of each of the first diffracted light and the second diffracted light and the +1-order light or the −1-order light is the maximal component of the third diffracted light, or so that the 0-order light is the maximal component of each of the second diffracted light and the third diffracted light and the +1-order light or the −1-order light is the maximal component of the first diffracted light.

10. The optical pickup of claim 1, wherein the optical means has an optical member with a plurality of blazed diffraction grating grooves.

11. The optical pickup of claim 1, further comprising:
a circuit for sending a signal based on an output of the photodetector to the servo mechanism;
wherein the servo mechanism changes the position of the objective lens on the basis of the output of the photodetector.

* * * * *